United States Patent
Goodman et al.

(10) Patent No.: US 10,540,241 B2
(45) Date of Patent: Jan. 21, 2020

(54) STORING LOG SNAPSHOTS IN AN AUTOMATED DATA STORAGE LIBRARY

(71) Applicant: INTERNATIONAL BUSINESS MACHINES CORPORATION, Armonk, NY (US)

(72) Inventors: Brian G. Goodman, Tucson, AZ (US); Leonard G. Jesionowski, Tucson, AZ (US); Jose G. Miranda Gavillan, Tucson, AZ (US); Kenny N. G. Qiu, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 15/297,470

(22) Filed: Oct. 19, 2016

(65) Prior Publication Data
US 2018/0107411 A1    Apr. 19, 2018

(51) Int. Cl.
*G06F 11/14*    (2006.01)

(52) U.S. Cl.
CPC ................. *G06F 11/1471* (2013.01)

(58) Field of Classification Search
CPC .... G06F 3/0619; G06F 3/065; G06F 11/1471; G06F 2201/84; G06F 3/067
See application file for complete search history.

(56) References Cited

U.S. PATENT DOCUMENTS

| | | | |
|---|---|---|---|
| 6,144,967 A | 11/2000 | Nock | |
| 7,568,078 B2 | 7/2009 | Sharma et al. | |
| 8,069,149 B1 | 11/2011 | Chen et al. | |
| 8,789,208 B1 | 7/2014 | Sundaram et al. | |
| 8,953,472 B2 | 2/2015 | Di Pietro et al. | |
| 9,064,043 B2 | 6/2015 | Cathro | |
| 9,081,888 B2 | 7/2015 | Hsieh et al. | |
| 2012/0054675 A1 | 3/2012 | Rajamannar et al. | |
| 2013/0227352 A1 | 8/2013 | Kumarasamy | |
| 2014/0019455 A1 | 1/2014 | Cochrane | |
| 2014/0310243 A1 | 10/2014 | McGee | |
| 2014/0330784 A1* | 11/2014 | Sundaram | H04L 29/06 707/639 |
| 2015/0074055 A1* | 3/2015 | Jacoby | G06F 17/30088 707/639 |
| 2015/0254141 A1* | 9/2015 | Wertheimer | G06F 11/1451 707/646 |
| 2015/0294431 A1 | 10/2015 | Fiorucci | |
| 2015/0347683 A1 | 12/2015 | Ansari | |
| 2016/0026837 A1 | 1/2016 | Good | |

(Continued)

OTHER PUBLICATIONS

List of IBM Patents or Patent Applications Treated as Related dated Oct. 20, 2016 (2 pages).

(Continued)

*Primary Examiner* — Ann J Lo
*Assistant Examiner* — Jane Wei
(74) *Attorney, Agent, or Firm* — Griffiths & Seaton PLLC

(57) ABSTRACT

Embodiments for storing log snapshots in an automated data storage library by a processor. A log snapshot is saved on a node associated with the automated data storage library for subsequent retrieval such that each of a plurality of saved log snapshots saved from a plurality of nodes associated with the automated data storage library are aggregated for exporting to a user.

17 Claims, 10 Drawing Sheets

(56) References Cited

U.S. PATENT DOCUMENTS

| | | |
|---|---|---|
| 2016/0210602 A1 | 7/2016 | Siddique |
| 2016/0259579 A1* | 9/2016 | Yamada ................ G06F 3/0619 |
| 2016/0342484 A1* | 11/2016 | French ................ G06F 11/1469 |
| 2017/0113046 A1 | 4/2017 | Fried |
| 2017/0177442 A1* | 6/2017 | Han .................... G06F 11/1471 |
| 2018/0027006 A1 | 1/2018 | Zimmermann |
| 2018/0059965 A1 | 3/2018 | Goodman et al. |

OTHER PUBLICATIONS

Unknown, "Using SmartView Tracker," https://sc1.checkpoint.com/documents/R76/CP_R76_SmartViewTracker_AdminGuide/83437.html[Aug. 31, 2016, 11:11:02 AM], 2013 (5 pages).

* cited by examiner

| | Location | Type | Time | User | Description | State | Log | Event Number |
|---|---|---|---|---|---|---|---|---|
| ⊗ | Frame 3, A side | Library | 8/2/16, 1:31 PM | System | An LCC card was not responding over Ethernet | | ✓ | 305 |
| ⊗ | Accessor 2 | Library | 8/2/16, 1:30 PM | System | A bar code scanner with invalid VPD was detected. | | | 302 |
| ⊗ | Accessor 1 | Library | 8/2/16, 1:24 PM | System | An MDA card CAN bus 1 failed | | | 298 |
| ⊗ | Accessor 1 | Library | 8/2/16, 1:23 PM | System | An ACC card CAN bus 1 failed | | | 304 |
| ⊗ | Accessor 1 | Library | 8/2/16, 12:48 PM | Service | An X motion failed due to loss of 40 V dc. | | | 190 |
| ⊗ | Accessor 2 | Library | 8/2/16, 9:11 AM | System | A bar code scanner with invalid VPD was detected | | | 172 |
| ⊗ | Accessor 2 | Library | 8/2/16, 8:34 AM | System | A bar code scanner with invalid VPD was detected | | | 154 |
| ⊗ | Frame 1 | Library | 8/2/16, 1:35 PM | System | The service bay barrier ws down when a slide door... | | | 230 |
| ⊗ | Frame 1 | Library | 8/2/16, 1:35 PM | System | The service bay barrier ws down when a slide door... | | | 110 |
| ⊗ | Frame 1 | Library | 8/2/16, 1:35 PM | System | The service bay barrier ws down when a slide door... | | | 212 |
| ⊗ | Frame 1 | Library | 8/2/16, 1:35 PM | System | The service bay barrier ws down when a slide door... | | | 239 |
| ⊗ | Frame 1 | Library | 8/2/16, 1:07 PM | System | Library logs were created | | | 106 |
| ⊗ | Frame 1 | Library | 8/2/16, 1:03 PM | Service | An inventory failed | | | |
| ⊗ | Frame 1 | Library | 8/2/16, 12:38 PM | System | The service bay barrier ws down when a slide door... | | | |
| ⊗ | Frame 1 | Library | 8/2/16, 12:38 PM | System | The service bay barrier ws down when a slide door... | | | |
| ⊗ | Frame 1 | Library | 8/2/16, 12:38 PM | System | The service bay barrier ws down when a slide door... | | | |
| ⊗ | Frame 1 | Library | 8/2/16, 5:14 PM | System | The service bay barrier ws down when a slide door... | | | |
| ⊗ | Accessor 2 | Library | 8/2/16, 4:26 PM | System | A bar code scanner with invalid VPD was detected | | | |
| ⊗ | Accessor 2 | Library | 8/2/16, 4:22 PM | System | A bar code scanner with invalid VPD was detected | | | |
| ⊗ | Frame 1 | Library | 8/2/16, 1:22 PM | Service | An inventory failed | | | |
| ⊗ | Accessor 2 | Library | 8/2/16, 1:05 PM | System | A bar code scanner with invalid VPD was detected | | | |
| ⊗ | Frame 5 | Library | 8/2/16, 1:04 PM | System | The service bay barrier ws down when a slide door... | | | |

FIG. 7

STORING LOG SNAPSHOTS IN AN AUTOMATED DATA STORAGE LIBRARY

BACKGROUND OF THE INVENTION

Field of the Invention

The present invention relates in general to computing systems, and more particularly to, various embodiments for storing log snapshots in an automated data storage library using a computing processor.

Description of the Related Art

Data storage libraries provide a means of storing large amounts of data for host computer systems. Automated data storage libraries are known for providing cost effective storage and retrieval of large quantities of data, typically from data storage cartridges stored in storage slots of the library. The libraries typically comprise large numbers of data storage media that are stored in storage shelves, numbers of data storage drives to read and write data with respect to the data storage media, one or more robot accessors to access the data storage media to move the data storage media between the storage shelves and data storage drives, and control units to control the operation of the library and control the flow of data and information between the library and host computer systems. The data storage cartridges are typically extracted from the storage slots or drives, placed in the storage slots or drives, and transported within the library by one or more accessors.

SUMMARY OF THE INVENTION

Various embodiments for storing log snapshots in an automated data storage library by a processor, are provided. In one embodiment, by way of example only, a method for selecting log snapshots for export in an automated data storage library, again by a processor, is provided. A log snapshot is saved on a node associated with the automated data storage library for subsequent retrieval such that each of a plurality of saved log snapshots saved from a plurality of nodes associated with the automated data storage library are aggregated for exporting to a user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 depicts a table or list having one or more events that may be displayed, where the events may be searched and/or browsed in accordance with aspects of the present invention;

DETAILED DESCRIPTION OF THE DRAWINGS

Figure 1:
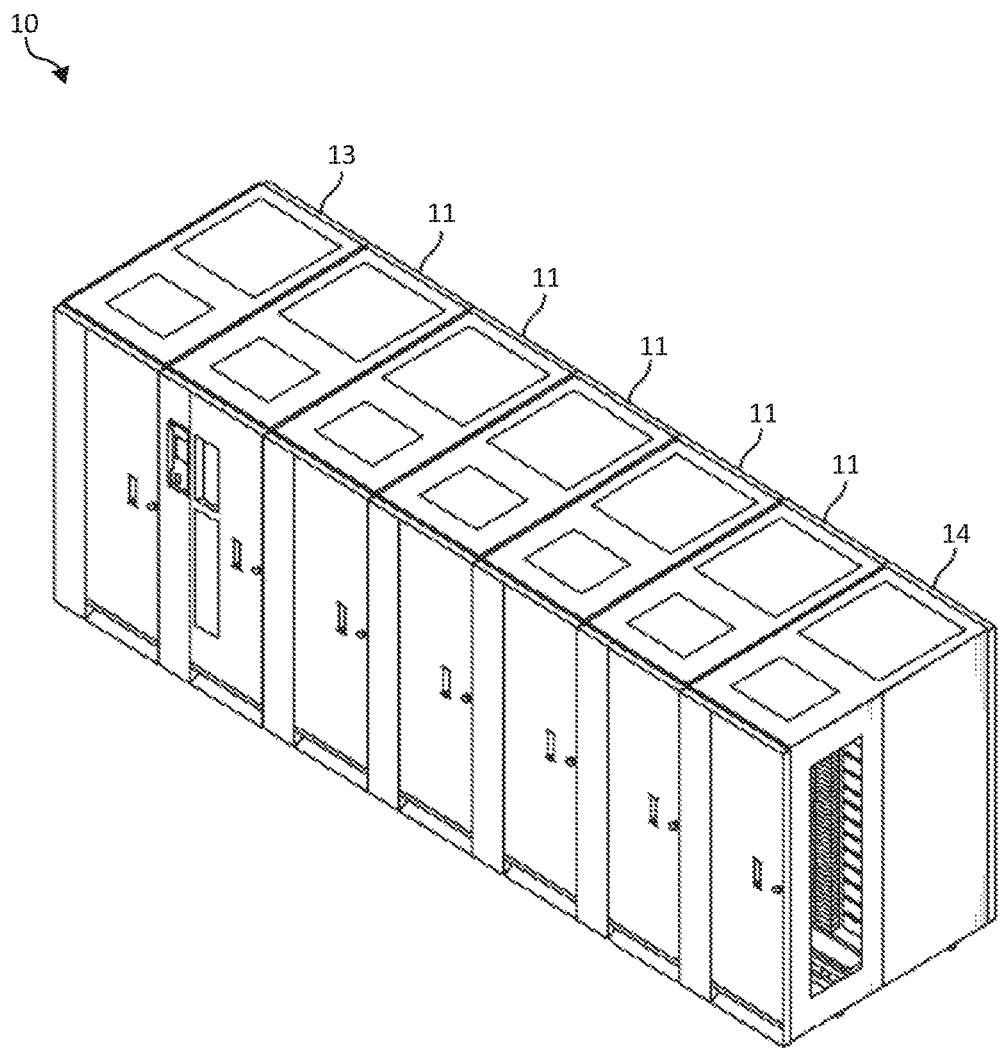
FIG. 1 is a block diagram of an automated data storage library in accordance with an embodiment of the present invention.

As previously stated, automated data storage libraries provide a means for storing large quantities of data on data storage media that are not permanently mounted in data storage drives, and that are stored in a readily available form on storage shelves or slots. One or more robot accessors retrieve selected data storage media from storage shelves and provide them to data storage drives. Typically, data stored on data storage media of an automated data storage library, once requested, is needed quickly. Automated data storage libraries may have logs for providing diagnostic information related to the operation and failure of the product. Logs may be exported through a user interface (e.g., a web user interface or command line interface). For example, when a library encounters a problem, an operator or service technician may use a web user interface on a customer port or a service port to collect logs before servicing the product.

However, a single log with the most recent activity relating to an automated data storage library may not be sufficient because the log can wrap (thus resulting in a loss of information) before the log may be actually exported or downloaded by a user. In addition, as automated data storage libraries are becoming increasingly complex, multiple log snapshots are required to capture all of the potential triggers or events needed to determine a root cause of a problem. For example, logs may be saved based on library errors, drive errors, doors opening, service being performed, host errors, etc.

Furthermore, when a user exports a log from a system without the embodiments as described herein, either there is only one log with the most recent activity or there may be multiple logs that are aggregated and then exported. The logs are aggregated at the time of, or just prior to, the export request, which may not be sufficient given the export request may not occur immediately following something that needs to be investigated in the log. For example, a library problem may occur on a weekend and a user may not see that the library had a problem for several days. Important information related to the problem may be lost (e.g. overwritten by newer data) by the time an export operation is initiated.

Also, one or more trigger events can lead to a large number of log snapshots that may occur at some amount of frequency. Currently, there is no defined way to predict which of the many log snapshots taken may actually be needed later for analysis. For example, if a library performed a complete end-to-end aggregation of a log snapshot every time a trigger event occurs, the library performance is negatively impacted and/or may even compromise the stability of the library (e.g. result in errors). Furthermore, a current challenge is determining which log is a correct log to export based on what the user is interested in evaluating.

Given the potentially large number of logs to store, a need exists to select logs for export in an automated data storage library. Also, a need exists to reduce the consumption of processor bandwidth, storage bandwidth and communication bandwidth to aggregate the log data in a library that comprises a plurality of nodes, two or more of which are capable of creating or storing logs (e.g., nodes of a distributed control system, data storage drives, other components associated with the automated data storage library, etc.).

Thus, the present technology provides a solution for selecting log snapshots for export in an automated data storage library. An automated data storage library may provide a user interface where events and/or errors can be correlated to a particular log snapshot. An events table may be used (e.g., by a user) to identify and/or locate an event of relevant interest. An action may be selected using the events table for exporting the corresponding log. In an additional aspect, the automated data storage library may allow a user to enter date and/or time information related to the time period for needing log information. The automated data storage library provides a "best match" (e.g., presents a most closely matched log to a user), based on the date and/or time information related criteria.

In one aspect, a log snapshot may be the result of saving one or more logs to capture details about an event or trigger. By saving the one or more logs, a snapshot avoids the loss of data that may occur when activity continues to be logged, with the potential to overwrite important activity that was logged earlier. As a result, a snapshot may be exported and evaluated at some later point in time. As used herein, exporting and downloading a log may refer to the same thing. A log (and therefore a snapshot or log snapshot) may be used to evaluate an operation or failure of the automated data storage library. The log(s) may comprise trace information (what was the library, drive or component doing), diagnostic information (what kinds of error or problems were encountered), statistical information (what was the performance or usage of various automated data storage library components), etc. When a complex system produces a number of log snapshots, the system may be unable pick a desired or selected snapshot for export. Moreover, the log snapshots may be large enough in size and large enough in number that exporting all of the log snapshots reduces processing capacity and efficiency. In addition, efficiency is reduced by having to perform an analysis on the total number of snapshots when that which is to be searched for may be undefined and/or unknown (e.g., it may not be clear exactly what a user is looking for).

In one aspect, a user may enter a date and/or time (herein date and/or time is referred to as date/time and time period refers to a date and/or time period) and the automated data storage library may search a list of log snapshots to find a match (a most closely related match or "best match" that have data, log content, date/time information, one or more attributes, characteristics, information, creation data, modification data, and/or patterns that are most closely related), which may comprise a single snapshot and/or more than one snapshot. A user may enter a date/time that may be associated with something that has occurred (e.g. a host application encountered an error). The library may use snapshot date/time information to determine the best match.

For example, many file systems may have file date/time information related to file creation, last modification, and the like. Alternatively, the library may store data for each log snapshot and the data may contain date/time information that the library uses to determine a best match. For example, the library may maintain a table that contains identifiers associated with log snapshots and date/time information for each log snapshot in the table. Still further, the library may search the contents of one or more snapshots to find embedded date/time information that is most closely related to the log contents of the snapshot to determine the best match. For example, a log snapshot may contain trace information and the trace information may have date/time information associated with each entry. The library may establish a start date/time and an end date/time associated with each log snapshot based on the first and last entry in the trace information.

In one aspect, an event may be an error, action, or activity that is recorded by the library. Some events may not trigger a log snapshot. For example, a user logging into the library, a drive cleaning, a logical library that is almost full of cartridges (e.g., greater than a defined percentage), the library is almost out of licensed storage slots (e.g., greater than a defined percentage), and the like. Some events may trigger a log snapshot. For example, a library error (e.g. the library cannot move a cartridge), drive error (e.g. a drive cannot unload a cartridge), host error (e.g. a logical unit reset or an illegal request), service action (e.g. logging into the library under a service role, pausing the library or replacing a library component), library door open (e.g. a front door, back door or service door), and the like. Some events may trigger a log snapshot yet one or more filtering rules may block the log snapshot at certain times or under certain conditions. For example, a library may have a finite storage capacity and be unable to store and maintain the large number of log snapshots that may occur for a given time period. Thus, one or more snapshot filters may be employed, such as only allowing one snapshot for a particular event within a defined time period (e.g., a 24-hour period) and/or only saving a selected number of snapshots prior to deleting one or more snapshots older than a defined snapshot storage time frame.

In one aspect, one or more events may be displayed as a table or a list, where the events may be searched and/or browsed. Herein, references to events in a table may refer to events in a table and/or a list. Events may have a state (e.g. active or inactive) and the state may change based on a user action (e.g. manually marking the event inactive) or based on a change to the underlying trigger (e.g. a defective power supply results in an event but a replacement of that power supply removes the event or marks the event inactive).

In one embodiment, events may be paired with log snapshots so a user only has to find the event of interest and then they may select an export action for exporting the snapshot associated with the identified event of interest. In a related embodiment, the event may include an indication of an associated log snapshot. In an additional aspect, a user may select the event and then select an export action. For example, there may be an export button that can be activated after selecting the desired event. In another example, after selecting one or more events, there may be an actions drop-down option that may contain an export action. In an additional example, a user may perform an action related to an external device associated with the library (e.g., a mouse device of a computer associated with, or connected to, the library such that performing a right click action of a mouse button to provide a context menu that contains an export action).

Turning now to an additional embodiment, the present technology also provides a solution for managing log snapshots in an automated data storage library that comprises two or more nodes associated with the automated data storage library. The nodes may comprise library controllers (e.g., one or more library controllers, backup or redundant library controllers, nodes of a library distributed control system, etc.), drive controllers (e.g., one or more processors of an automated data storage drive), component controllers (e.g., one or more processors of a component of the library such as power supplies, Ethernet switches, etc.), device controllers (e.g., one or more processors of devices connected to the library such as a management console, a service machine, an encryption key server, etc.). The nodes perform a function of the automated data storage library because they are either a component of the library (e.g., drives, power supplies, library controller, nodes of a library distributed control system, etc.) or because they help perform a service or function of the library (e.g., an encryption key server helps encrypt data for the automated data storage library, a service console helps with monitoring and servicing of the library, a management interface helps a user interact with the library, etc.). A log snapshot may be generated by, or saved on, a node associated with the automated data storage library for subsequent retrieval such that each of a plurality of saved log snapshots saved from a plurality of nodes in the distributed control system are aggregated for exporting to a user. In one aspect, the automated data storage library is a tape library.

For example, upon receiving a trigger for a snapshot, two or more nodes of a distributed control system (multiple processors or nodes that may be capable of each having their own logs) saves one or more logs (e.g. a single trigger may result in one or more logs from each node in the distributed control system) for later retrieval. When a user needs to export (download) the snapshot (saved logs), the saved logs related to a specific trigger event (or saved time) may be aggregated from each one of the nodes in the distributed control system at that time of the export request (e.g., aggregated on demand).

The one or more logs include information (e.g., trace information) related to the library, such as, diagnostic information (e.g., what kinds of error or problems were encountered), statistical information (e.g., what was the performance or usage of various library components), configuration information, backup information, database information, or a combination thereof. Log snapshots may be employed to save logs immediately following a trigger (e.g. a library detected error or service action being performed). A log snapshot comprises saving one or more logs for potential export at a later time. This ensures that any data related to a trigger (e.g. library detected error) is actually recorded in the log snapshot with no possibility of it being overwritten before someone has a chance to export the log(s). The aggregation of a log snapshot occurs at the time of, or just after, the export request. Herein, exporting and downloading a log refer to the same thing and aggregation refers to collecting one or more related logs, files, structures, databases, tables, packets, etc. The aggregation process may combine some or all of the collection or it may preserve the original data format.

In an additional aspect, the automated data storage library may comprise a distributed control system that may have two or more nodes performing a function of the library. For example, a redundant library may have two library controllers so that one library controller can take over when the other library controller fails. In another example, a library may have a node associated with a movement of an accessor (e.g. a node that controls motors to move an accessor in a horizontal and vertical direction), a node associated with grabbing data storage cartridges (e.g. a node that controls actuators or motors to grab or release a cartridge), a node associated with drive communication (e.g. a node in each drive frame that communicates with the drives), etc. A node may comprise one or more processors or controllers which may have the ability to create, store, and/or collect logs.

A log snapshot may be saved when a trigger event is detected. That is, a log snapshot may be saved when a library error is detected (e.g., a failure to move a cartridge to a drive), drive error is detected (e.g., a failure to read data from a cartridge), component error is detected (e.g., a power supply failure), device error is detected (e.g., failure of an encryption key server, service console, or management interface associated with the library), host error is detected (e.g., a host error associated with a host application or device driver such as sending a command to the library or drive that results in an illegal request), activation of a designated physical or logical log collection mechanism is detected (e.g., a dedicated log collection button), when a library door is open is detected, when a library door close is detected, when a user logs into the library under a service role, when a component is replaced, reset of the library (e.g., part or all of the library controller is reset), reset of a component (e.g., a power supply reset), reset of a device (e.g., a reset of an encryption key server, service console, or management interface associated with the library), reset of a drive, detecting a new unique identifier (e.g., a component, device, or drive serial number or MAC address changes), and the like.

In one embodiment, when a trigger results in a log snapshot, each node in the distributed control system may save its own snapshot (e.g., a snapshot of each individual node) and the saved snapshot on each individual node stays with the node until an export request is received or processed (that involves the snapshot on the particular node). If at some point in time, a user requests a particular snapshot for export, the associated snapshots of each node may be aggregated and exported at the time of request or "on demand". In other words, the snapshot data is saved at the time of the trigger event, but it is not aggregated until the saved snapshot is actually needed, which may or may not occur. This eliminates processor bandwidth, communication bandwidth and storage bandwidth for any log snapshot that may not ever actually result in an export request. This further provides additional advantages over the current state of the art by only consuming library compute resources for aggregation until the saved snapshot is needed.

In addition to, or alternatively to, holding off the aggregation until the snapshots are actually needed, the aggregation of the saved snapshots may occur as a background operation. Accordingly, the impact to the library compute resources may be reduced because the aggregation is spread out over a longer period of time in the background. The aggregation of the saved snapshots may also occur when the library is not executing any host commands (e.g., no host commands are detected). This provides significant advantage over the current state of the art by not consuming any library compute resources if the library is performing a more critical task of executing host commands. The aggregation of the saved snapshots may occur when the library is idle (e.g. when the library is not doing anything). This has the advantage of not consuming any library compute resources if the library is performing any other actions (e.g. executing operator commands, executing host commands, importing or exporting cartridges, performing drive cleaning, library or drive calibration, etc.).

Since, according to the embodiments of this invention, the aggregation is not occurring at or around the time of the trigger, the library may be constrained to manage the log snapshots on the individual nodes so saved snapshots can be aggregated. In one aspect, a file name may be used to coordinate multiple logs for aggregation. For example, all related log snapshots may have correlating information in the file name such as, for example, an index or sequence number, date and/or time information, etc. File metadata may also be used to correlate multiple logs for aggregation.

For example, files have date/time information for when the file was created or modified and one or more of these metadata fields may be used to determine which snapshots should be correlated. In another embodiment, a table, list, file or other data structure may be used to correlate which logs are related for aggregation. For example, the library may comprise a log table that contains a list of snapshots and each snapshot may have an index, sequence number, date and/or time, or other information in the table that allows the library to correlate different snapshots for aggregation.

It should be noted that the present invention has application to any suitable storage subsystem with an automated storage media and retrieval library for storing and accessing storage media located within the subsystem. Further, storage media may be magnetic storage media such as magnetic tape and magnetic disk, optical storage media such as compact disk (CD) and digital versatile disk (DVD), electronic storage media such as swappable flash electrically programmable read only memory (flash EPROM, CompactFlash, secure digital ("SD"), micro SD, etc.) or any suitable equivalent non-volatile removable storage media.

Figure 2:
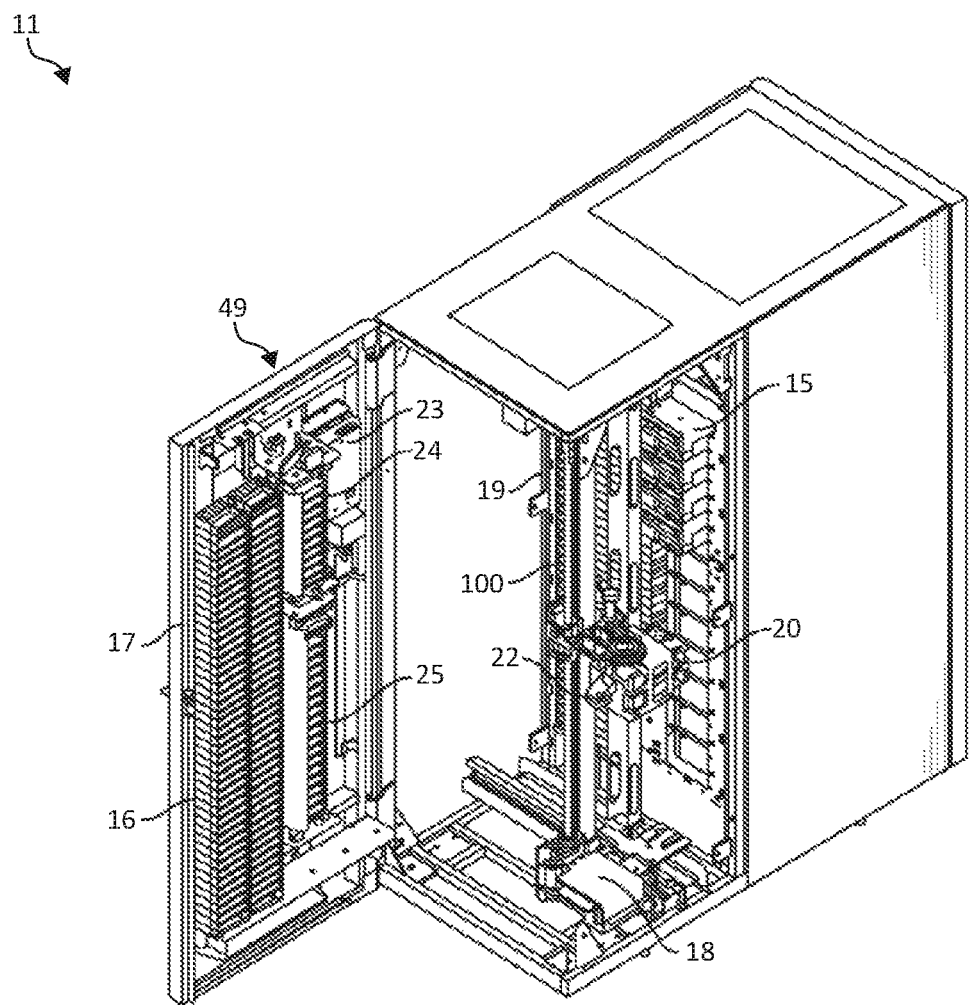
FIG. 2 is a block diagram of a frame of the automated data storage library of FIG. 1, with the view specifically depicting an exemplary basic configuration of the internal components of a library.

Turning now to FIGS. 1 and 2, an automated data storage library 10 which stores and retrieves data storage cartridges containing data storage media (not shown) at multi-cartridge deep slot cells 100 and single cartridge storage slots 16. It is noted that references to "data storage media" herein refer to the recording media of data storage cartridges, and for purposes herein the two terms may also be used synonymously. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage slots, deep slot cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage slots 16 on front wall 17 and a plurality of multi-cartridge deep slot cells 100 on rear wall 19, both for storing data storage cartridges that contain data storage media. The library 10 may also include one or more doors 49 (e.g., a front door, a side door, and/or a back door). That is, the library 10 access door 49 may comprise a door, hatch, cover, panel, magazine, or any other structure or assembly that may provide access to any internal portion of the library 10 that is not normally accessible.

The storage slots 16 are configured to store a single data storage cartridge, and the multi-cartridge deep slot cells 100 are configured to store a plurality of data storage cartridges arranged in sequential order of tiers from front to rear. The library also comprises at least one data storage drive 15 for reading and/or writing data with respect to the data storage media; and a first accessor 18 for transporting the data storage cartridges between the plurality of storage slots 16, the multi-cartridge deep slot cells 100, and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage cartridges to be added to the library inventory and/or removed from the library without disrupting library operation. Herein, adding data storage cartridges to the library may also be called "inserting" or "importing" data storage cartridges. Herein, removing data storage cartridges from the library may also be called "ejecting" or "exporting" data storage cartridges. Also herein, slots of the multi-cartridge deep slot cells 100, the single cartridge storage slots 16, the cartridge slot of drive(s) 15, and the slots of I/O station 24, 25 may all be referred to as storage slots. Thus, any location at which a data storage cartridge may reside within the library 10 may be referred to as a storage slot. The library 10 may comprise one or more storage frames 11, each having storage slots 16 and/or multi-cartridge deep slot cells 100 accessible by first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges, and another storage frame 11 may comprise storage slots 16 and/or multi-cartridge deep slot cells 100 and no other components.

The first accessor 18 comprises a gripper assembly 20 for gripping one or more data storage cartridges. The gripper assembly may include one or more sensors 22, mounted on or near the gripper 20, to "read" identifying information about the data storage cartridge and to locate fiducial marks for calibrating the library.

Figure 3:
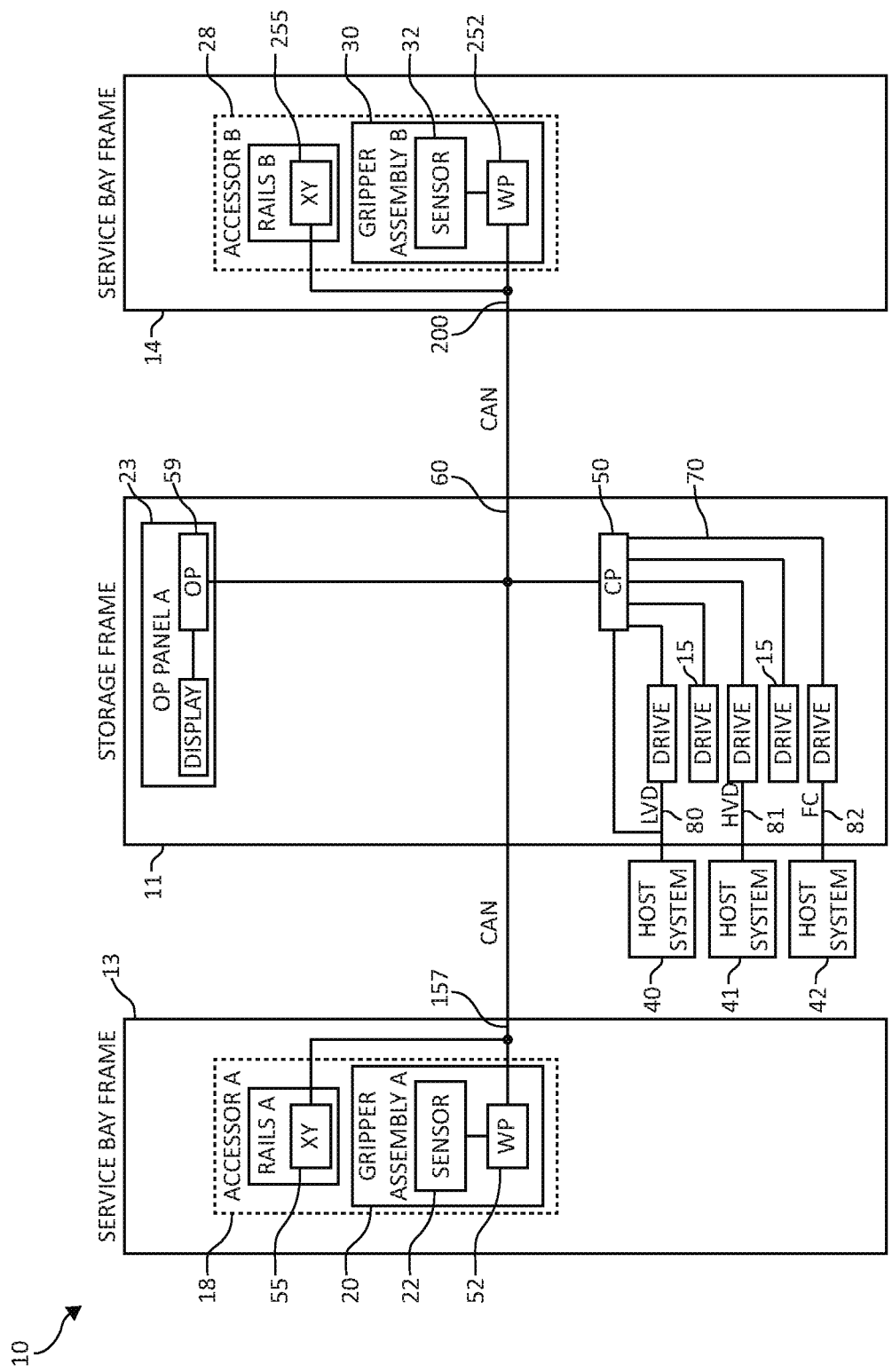
FIG. 3 is a block diagram of the automated data storage library of FIGS. 1 and 2, with the diagram depicting a library that employs a distributed system of modules with a plurality of processor nodes.

FIG. 3 illustrates an embodiment of an automated data storage library 10 of FIGS. 1 and 2, which employs a controller arranged as a distributed system of modules with a plurality of processor nodes. While the automated data storage library 10 is illustrated as employing a distributed control system, the present invention may be implemented in automated data storage libraries regardless of control configuration, such as, but not limited to, an automated data storage library having one or more library controllers that are not distributed.

The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include one or more sensors 22 to "read" identifying information about the data storage cartridges and to locate and calibrate fiducial marks. The right hand service bay 14 is shown with a second accessor 28. The second accessor 28 comprises a gripper assembly 30 and may include one or more sensors 32 to "read" identifying information about the data storage cartridges and to locate fiducial marks. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage cartridge at the storage slots 16 and multi-cartridge deep slot cells 100, or input/output stations 24, 25, and to mount and demount the data storage cartridge at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage cartridges and move the cartridges, for example, between the storage slots 16 and the data storage drives 15. The commands are typically logical commands identifying the cartridges or cartridge media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a library controller, which in one embodiment comprises a distributed control system receiving the logical commands from hosts, determining the required actions, and converting the actions to physical movements of and actions by first accessor 18 and/or second accessor 28.

In the exemplary library, the distributed control system comprises a plurality of processor nodes, each having one or more computer processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and/or the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network or Ethernet.

Additional storage frames 11 may be provided and each is coupled to the adjacent storage frame. Any of the storage frames 11 may comprise communication processor nodes 50, storage slots 16, multi-cartridge storage cells 100, data storage drives 15, and networks 60. Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage cartridges, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13. Alternatively, one or more of the processor nodes (XY 55, WP 52, CP 50, OP 59, XY 255, and WP 252) may comprise dual networks (not shown) to allow independent redundant communication between the processor nodes and/or the accessors 18, 28.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

An automated data storage library 10 may comprise one or more controllers to direct the operation of the automated data storage library. Host computers and data storage drives typically comprise similar controllers. A library controller may take many different forms and may comprise, for example but not limited to, an embedded system, a distributed control system, a personal computer, or a workstation. Essentially, the term "library controller" as used herein is intended in its broadest sense as a device that contains at least one computer processor, as such term is defined herein.

Figure 4:
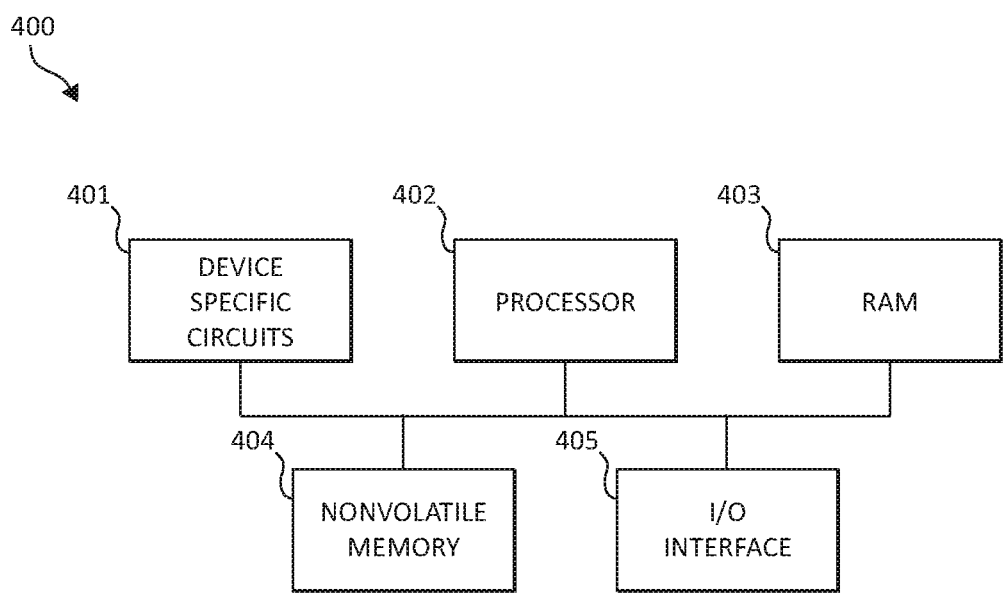
FIG. 4 is a block diagram depicting an exemplary controller configuration.

FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 may be used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, CompactFlash (CF), Secure Digital (SD), micro-SD, and hard disk drives. The nonvolatile memory 404 may be used to hold the executable firmware and any nonvolatile data. The I/O interface 405 comprises a communication interface that allows the processor 402 to communicate with devices external to the controller. Examples may comprise, but are not limited to, serial interfaces (e.g., RS-232 or RS-422), USB (Universal Serial Bus), Ethernet, or SCSI (Small Computer Systems Interface). The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5A:
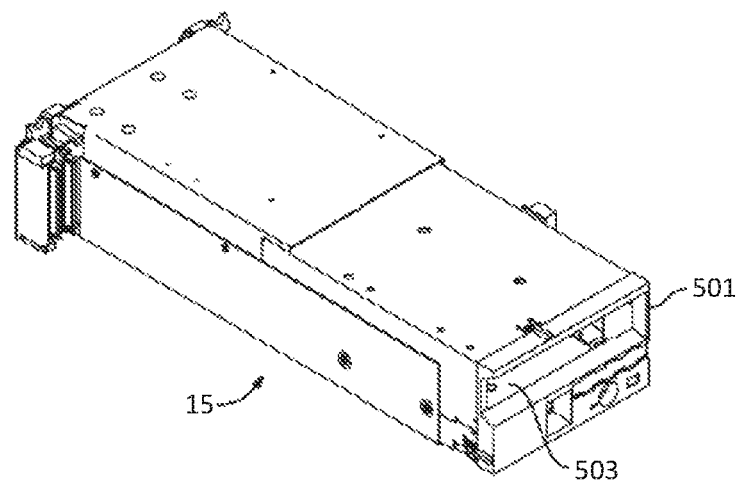
FIGS. 5A and 5B are isometric views of the front and rear of a data storage drive of the automated data storage library of FIGS. 1, 2 and 3.
Figure 5B:
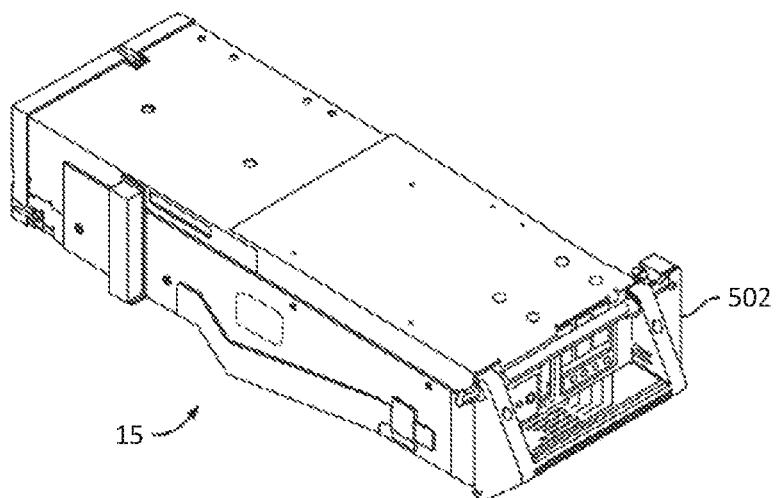

FIGS. 5A and 5B illustrate an embodiment of the front 501 and rear 502 of a data storage drive 15. In the example, the data storage drive 15 comprises a hot-swap drive canister. This is only an example and is not meant to limit the invention to hot-swap drive canisters. In fact, any configuration of data storage drive may be used whether or not it comprises a hot-swap canister. A data storage cartridge may be placed into the data storage drive 15 at opening 503. As discussed above, a data storage drive 15 is used to read and/or write data with respect to the data storage media of a data storage cartridge, and may additionally communicate with a memory which is separate from the media and is located within the cartridge.

Figure 6:
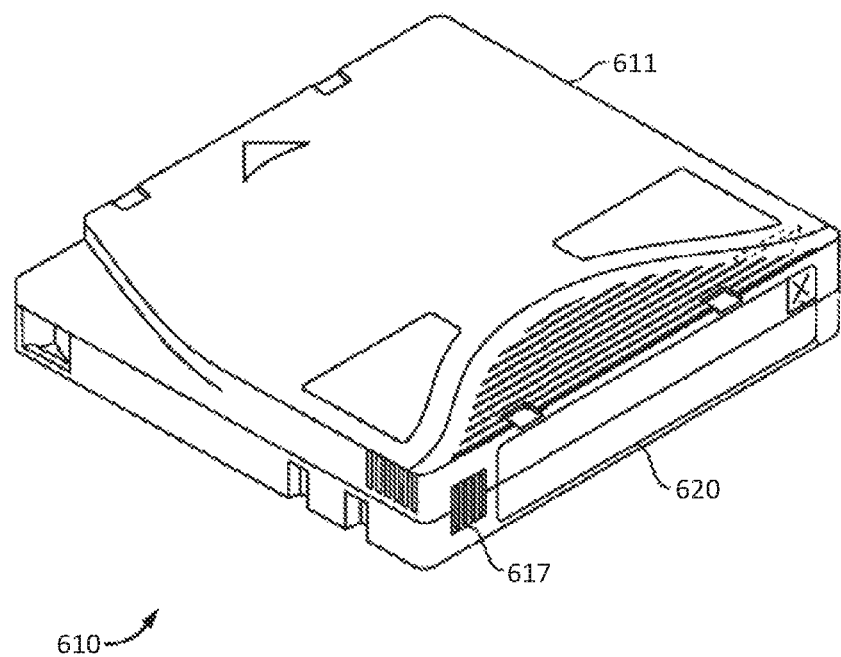
FIG. 6 is an isometric view of an example of an element, such as a cartridge, which may be placed in a storage slot of the automated data storage library of FIGS. 1, 2 and 3, in accordance with an embodiment of the present invention.

FIG. 6 illustrates an embodiment of a data storage cartridge 610 with cartridge shell 611, front label area 620, and write protect switch 617.

As indicated herein, one or more events may be displayed as a table or a list, where the events may be searched and/or browsed, such as the events table or list 700 of FIG. 7. The events table or list 700 may include search capabilities where a user can search for a particular event and/or a list of events based on one or more search criteria. The events table or list 700 may include sorting capabilities where a user can sort the table or list of events (e.g. sorting events by a column in the events table or list 700). The events of the events table or list 700 may include information of the snapshot such as, for example, a location, a type, time, a user, description, a state, an indication as to whether a log snapshot has been captured (e.g., as indicated in FIG. 7 with a "check mark" ('✓')), and/or an event number. In one aspect, the state (e.g. active or inactive) may change based on an action (e.g. a user marking the event inactive) or based on a change to the underlying trigger (e.g. a defective power supply results in an event but a replacement of that power supply removes the event or marks the event inactive).

In one embodiment, events may be paired with log snapshots so a user only has to find the event of interest and then they may select an export action for exporting the identified event of interest. In a related embodiment, the event may include an indication of an associated log snapshot. For example, there may be a "log available" column in the events table or list and a column may have a check mark in it to indicate that an associated log snapshot may be available for the event in the same row of the events table or list. In an additional aspect, a user may select the event and then select an export action. For example, there may be an export button that can be activated after selecting the desired event. In another example, after selecting one or more events, there may be an actions drop-down option that may contain an export action. In additional example, a user may perform an action related to an external device associated with the library (e.g., a mouse device of a computer associated with the library such that performing a right click action of a mouse button to provide a context menu that contains an export action). In an additional example, a user may drag an object on the screen (representing a particular event) to an export folder, container, action object, etc. to initiate an export operation.

Each row of the events table or list 700 may also represent a different event. A user may select one or more action items to select an action for any selected events. In one aspect, the action item may provide the ability to export any logs associated with the selected events. Alternatively, a user may right-click an event row and produce a context menu, which may include an export Log item for exporting any logs associated with the event. A log column may illustrate an example of identifying which event rows have logs available. In this example, the check mark may indicate in an event row that may have an associated log snapshot. One or more columns in the events table or list 700 may be sorted by clicking on a particular column. For example, the table may be sorted by severity since it may be likely that someone is looking for a log associated with a serious event. In another example, the events table or list 700 may be sorted by date/time since a user may be looking for one or more logs, for example, that may be associated with something that occurred on particular date and/or time.

Figure 8:
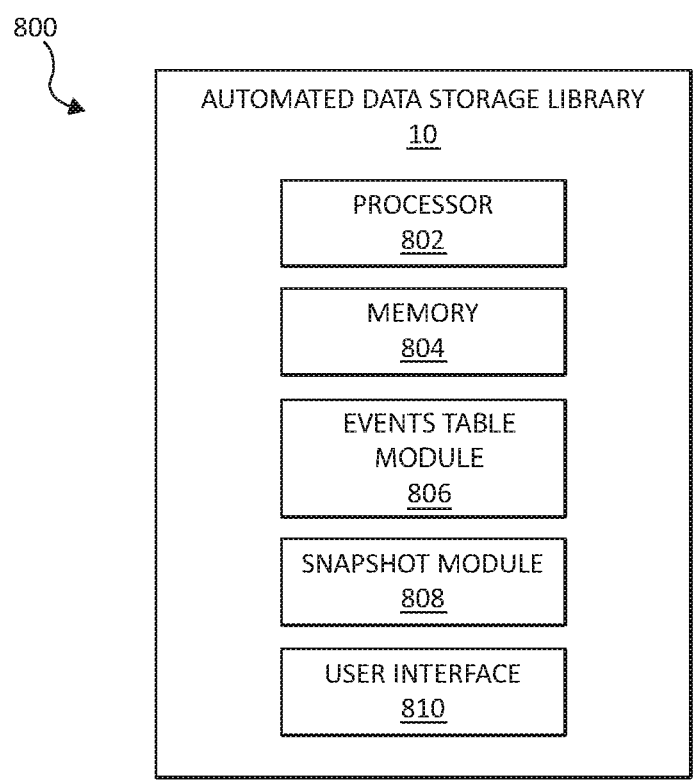
FIG. 8 is a block diagram depicting exemplary functional components according to various mechanisms of the illustrated embodiments in accordance with aspects of the present invention.

Turning now to FIG. 8, a block diagram 800 depicting exemplary functional components 800 according to various mechanisms of the illustrated embodiments, is shown. Automated data storage library 10 is again shown, incorporating processing unit 802 ("processor") to perform various computational, data processing and other functionality in accordance with various aspects of the present invention. Memory 804 may include RAM (static RAM, SDRAM, DRAM, etc.), nonvolatile memory (battery backup RAM, flash PROM, EEPROM, etc.), and/or other storage devices (hard drives, tape drives, optical disk drives, CompactFlash, MicroSD, SD, etc.). A snapshots module 808 is shown, along with an event table module 806 and a user interface 810.

As one of ordinary skill in the art will appreciate, the depiction of the various functional units in an automated data storage library 10 is for purposes of illustration, as the functional units may be located within automated data storage library 10 or elsewhere within and/or between distributed computing components or other components associated with automated data storage library 10. The snapshot module 808 may include a data repository of various snapshots of the automated data storage library 10 and may have associated metadata information. The snapshot module 808 may work in concert with processing unit 802 and memory 804 to accomplish various aspects of the present invention, such as, for example capturing a snapshot of one or more logs associated with the automated data storage library 10 upon detection of a triggering event. The snapshot module 808 may include snapshots of one or more logs related to the items or actions associated with one or more events or triggers as described herein. The snapshot module 808 may also monitor and store the snapshots and use a snapshot threshold, or a snapshot filter in order to control an amount of saved snapshots.

Events table module 806 may work in concert with processing unit 802 and memory 804 to accomplish various aspects of the present invention. For example, the events table module 806 may include identifiers associated with log snapshots and date/time information for each log snapshot and may be used to search for a particular event or a list of events based on the search criteria by an operator (user/technician) for exporting or downloading. In one aspect, events table module 806 may undergo various data analytics functions associated with searching and detecting an event. Events table module 806 may make decisions in conjunction with the snapshot module 808 to select the event and an export action. As one of ordinary skill in the art will appreciate, the events table module 806 and snapshot module 808 may implement searching, sorting, classification, mathematical modeling, snapshot functionality, sensing functionality, or other data processing technologies to carry out the various mechanisms of the illustrated embodiments. As one of ordinary skill in the art will appreciate, events table module 806 and/or snapshot module 808 may be implemented in library firmware and may be executed by a single processor or by multiple processors. For example, different discrete or atomic operations associated with event table module 806 and/or snapshot module 808 may be spread among multiple processors functions, threads, processes, code images, files, etc. In addition, events table module 806 and/or snapshot module 808 may be implemented in library hardware such as FPGA (Field Programmable Gate Array), ASIC (Application Specific Integrated Circuit), discrete logic, or the like. Still further, events table module 806 and/or snapshot module 808 may be implemented in a combination of library firmware and hardware.

In one aspect, logs may be exported via the user interface 810 (e.g., a graphical user interface). For example, an operator or service technician may use the user interface 810 on a customer port or a service port to export logs or snapshots associated with snapshot module 808 before or after servicing the product. If a request is made for these logs (e.g., a root cause analysis) the snapshot module 808 may provide to the user interface 810 one or more snapshots relating to one or more events. In this way, most or all of the information in the one or more logs captured via the snapshots are preserved. This functionality is illustrated by example with the user interface (GUI) 810, which provides information from the processing unit 802 and memory 804, or receives input and/or selection data from a user. In one aspect, the user interface (e.g., a graphical user interface 'GUI') may be associated with the library 10. A login operation may be performed in the user interface 810 and navigated therein to display a "service screen log download link" or selector (e.g., a button) in order to export any necessary logs or snapshots to a storage device. The user interface may have a remote network connection with the library. For example, the library may be at one location and a user may access the library from a completely different location using an intranet or internet connection. In addition, the user interface may be provided through a remote computer. For example, the library may provide a remote service capability that allows someone from the library support organization to remotely connect to the library for diagnostic purposes. In another example, the library may provide a "call home" service where it contacts a remote support computer after certain errors or based on a periodic interval. The "call home" service may provide logs to a support center automatically.

Figure 9:
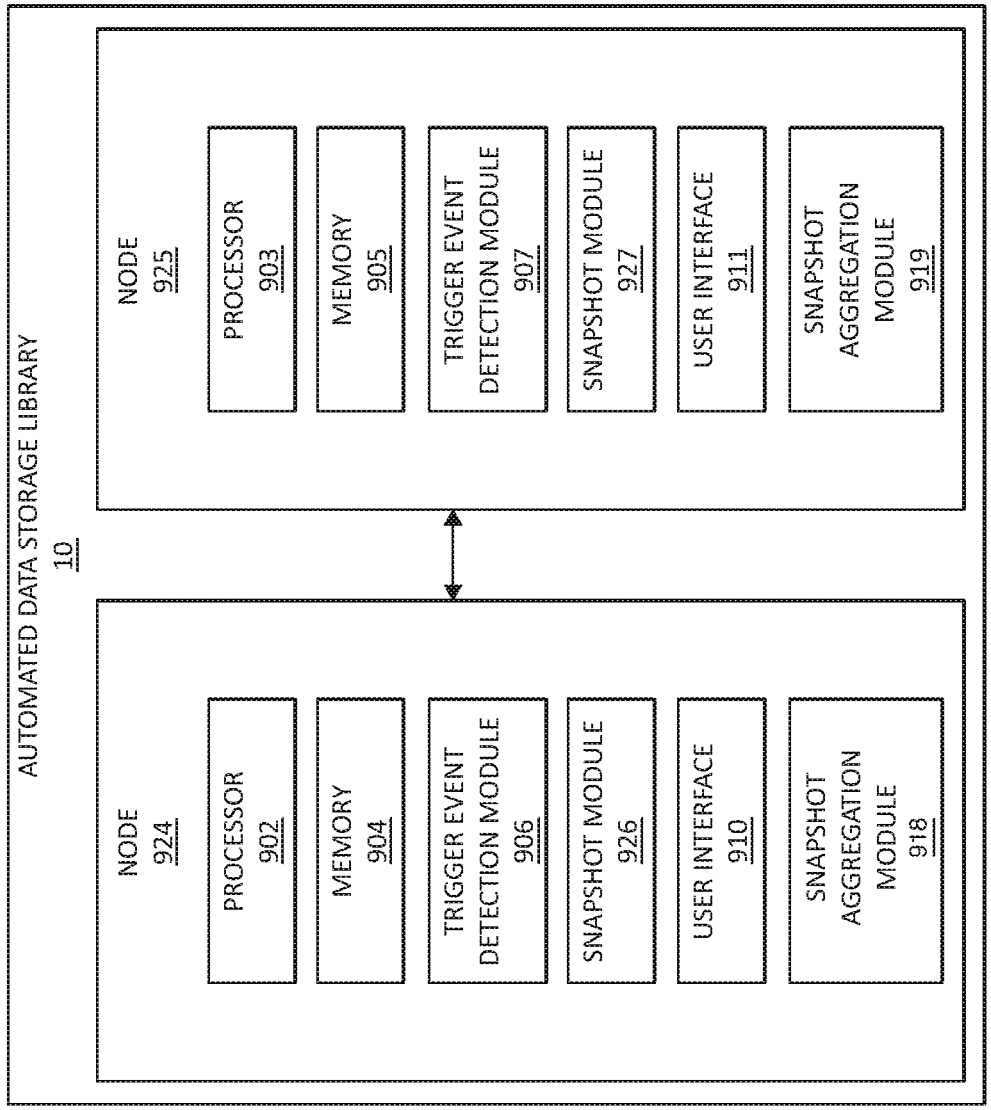
FIG. 9 is a block diagram depicting additional functional components according to various mechanisms of the illustrated embodiments in accordance with aspects of the present invention.

Turning now to FIG. 9, a block diagram 900 depicting exemplary functional components 900 according to various mechanisms of the illustrated embodiments, is shown. Automated data storage library 10 is again shown, with node 924 incorporating processing unit 902 to perform various computational, data processing and other functionality in accordance with various aspects of the present invention. Memory 904 may include RAM (static RAM, SDRAM, DRAM, etc.), nonvolatile memory (battery backup RAM, flash PROM, EEPROM, etc.), and/or other storage devices (hard drives, tape drives, optical disk drives, CompactFlash, MicroSD, SD, etc.). A snapshot aggregation module 918 is shown, along with a trigger event detection module 906, user interface module 910 and a snapshot module 926. Also depicted is node 925 (illustrated as a single node for illustrated convenience but multiple nodes may be included therein) which may include processor 903, memory 905, trigger event detection module 907, snapshot module 927, user interface 911 and snapshot aggregation module 919. Nodes 924, 925 represent controllers associated with the library such as library controllers (e.g., one or more library controllers, backup or redundant library controllers, nodes of a library distributed control system, etc.), drive controllers (e.g., one or more processors of an automated data storage drive), component controllers (e.g., one or more processors of a component of the library such as power supplies, Ethernet switches, etc.), device controllers (e.g., one or more processors of devices connected to the library such as a management console, a service machine, an encryption key server, etc.). Herein, a node, such as nodes 924 and 925, may comprise any controller, device, or component associated with the library that is capable of generating or storing one or more logs.

In one aspect, snapshot module 926 may save one or more log snapshots on a node, such as node 924, of automated data storage library 10. In addition, snapshot module 927 may save one or more log snapshots on a node, such as node 925, of automated data storage library 10. Alternatively, the snapshot module of another node may save the snapshot. For example, snapshot module 926 of node 924 may save a snapshot associated with node 925. This may be useful when node 925 is a data storage drive, or another component, and that node does not have the capability to store snapshots for later retrieval. The snapshots may be saved for subsequent retrieval such that each of a plurality of saved log snapshots saved from a plurality of nodes in the automated data storage library 10 may be aggregated for exporting to a user. When an export request is received, to export snapshots associated with a particular event or trigger, snapshot aggregation module 918 and/or snapshot aggregation module 919 may aggregate any library snapshots, drive snapshots and/or component snapshots related to that event or trigger. One snapshot aggregation module may be responsible for aggregating all of the snapshots from all of the nodes in the library, or an aggregation module associated with each node may aggregate the snapshots associated with that node and one of those aggregation modules (or another aggregation module altogether) may aggregate all of the aggregated snapshots from each of the nodes. Trigger event detection module 906/907, snapshot module 926/927, user interface 910/911, and/or snapshot aggregation module 918/919 may not be present on every node and may only be present on one node of automated data storage library 10.

As one of ordinary skill in the art will appreciate, the depiction of the various functional units in automated data storage library 10 is for purposes of illustration, as the functional units may be located anywhere between nodes or distributed computing components.

In one aspect, the snapshot aggregation module 918/919 may include a data repository of various aggregated snapshots of the automated data storage library 10 and may include associated metadata information. The aggregated snapshots may be aggregated from one or more nodes, such as node 924/925, of the automated data storage library 10. The snapshot module 926 may work in concert with processing unit 902 and memory 904 to accomplish various aspects of the present invention, such as, for example capturing a snapshot of one or more logs associated with the automated data storage library 10 upon detection of a triggering event. The snapshot aggregation module 918 may include saved snapshots of one or more logs related to the items or actions associated with the automated data storage library 10 performing one or more commands or functions, as described herein.

More specifically, the snapshot aggregation module 918 may aggregate each of the saved log snapshots from each respective one of the plurality of nodes, such as nodes 924/925, upon receiving a request from a user via the user interface 910 for one or more of the plurality of saved log snapshots in the locally saved and stored on each respective one of the plurality of nodes, such as nodes 924/925. The snapshot aggregation module 918 may aggregate each of the saved log snapshots from each respective one of the plurality of nodes, such as nodes 924/925, as a background operation of the automated data storage library 10. The snapshot aggregation module 918 may aggregate each of the saved log snapshots from each respective one of the plurality of nodes, such as nodes 924/925, while the automated data storage library 10 is idle. As an alternative option, the snapshot aggregation module 918 may aggregate each of the saved log snapshots from each respective one of the plurality of nodes, such as nodes 924/925, upon detecting an absence of one or more host commands.

Trigger event detection module 906 may work in concert with processing unit 902 and memory 904 to accomplish various aspects of the present invention. For example, the trigger event detection module 906 may include the library firmware of the automated data storage library 10 and may be used to detect actions, errors, events (triggers) and take a snapshot of one or more logs for later retrieval. In one aspect, trigger event detection module 906 may undergo various data analytics functions associated with identifying and detecting a triggering event. Trigger event detection module 906 may make decisions in conjunction with the snapshot module 926 and/or the snapshot aggregation module 918 to detect the triggering event so as to immediately trigger the snapshot module to capture and generate a snapshot of one or more logs of the automated data storage library 10. More specifically, the trigger event detection module 906 may work in conjunction with the snapshot module 926 for saving the log snapshot on the node upon detecting, by the trigger event detection module 906, at least one of a library error, a drive error, a component error, a device error, a host error, activation of a designated physical or logical log collection mechanism, a library door is opened, a library door is closed, a component is replaced, a library reset, a component reset, a device reset, a reset of a drive, identifying a new unique identifier, when a user logs into the library under a service role, or a combination thereof.

As one of ordinary skill in the art will appreciate, the trigger event detection module 906/907, the snapshot aggregation module 918/919, and/or the snapshot module 926/927 may implement mathematical modeling, snapshot functionality, sensing functionality, or other data processing technologies to carry out the various mechanisms of the illustrated embodiments. As one of ordinary skill in the art will appreciate, trigger event detection module 906/907, snapshot aggregation module 918/919, and/or snapshot module 926/927 may be implemented in library firmware and may be executed by a single processor or by multiple processors. For example, different discrete or atomic operations associated with the trigger event detection module 906/907, the snapshot aggregation module 918/919, and/or the snapshot module 926/927 may be spread among multiple processors functions, threads, processes, code images, files, etc. In addition, trigger event detection module 906/907, the snapshot aggregation module 918/919, and/or the snapshot module 926/927 may be implemented in library hardware such as FPGA (Field Programmable Gate Array), ASIC (Application Specific Integrated Circuit), discrete logic, or the like. Still further, trigger event detection module 906/907, the snapshot aggregation module 918/919, and/or the snapshot module 926/927 may be implemented in a combination of library firmware and hardware.

In one aspect, logs may be exported via user interface 910/911 (e.g., a graphical user interface). For example, an operator or service technician may use a user interface 910/911 on a customer port (e.g., an Ethernet port, wireless connection, other communications interface or network connection, local touchscreen, local monitor and keyboard, etc.) or a service port (e.g., an Ethernet port, wireless connection, other communications interface or network connection, local touchscreen, local monitor and keyboard, etc.) to export logs or snapshots associated with snapshot aggregation module 918 before or after servicing the product. If a request is made for these logs (e.g., a root cause analysis) the snapshot aggregation module 918/919 and the snapshot module 926/927, working in conjunction with each other, may provide to the user interface 910/911 one or more snapshots saved on each node, such as node 924/925, of the automated data storage library 10. In this way, most or all of the information in the one or more logs captured via the snapshots are preserved and aggregated if, and only if, the saved snapshots are requested. This functionality is illustrated by example with the user interface (GUI) 910/911, which provides information from the processing unit 902/903 and memory 904/905, or receives input and/or selection data from the user.

In one aspect, the user interface (e.g., a graphical user interface 'GUI') may be associated with the library 10. A login operation may be performed in the user interface 910/911 and navigated therein to display a "service screen log download link" or selector (e.g., a button) in order to download any necessary snapshots to a storage device.

With the foregoing functional components, the mechanisms of the illustrated embodiments may manage log snapshots in an automated data storage library that comprises multiple nodes by a processor. The log snapshot may be saved on a node associated with the automated data storage library for subsequent retrieval such that each of a plurality of saved log snapshots saved from a plurality of nodes in the library are aggregated for exporting to a user. In one aspect, the automated data storage library is a tape library. Upon receiving a request for a snapshot, a plurality of nodes of the automated data storage library (multiple processors or nodes capable of each creating and/or saving logs) saves one or more logs (e.g. a trigger resulting in logs from each node in the library) for later retrieval. When the library exports the saved logs, the saved logs related to a specific trigger event (or saved time) may be aggregated from each of the nodes in the library at that time of export (e.g., aggregated on demand). The one or more logs include information related to the library, such as, diagnostic information, statistical information, configuration information, backup information, database information, or a combination thereof. Log snapshots may be employed to save logs immediately following a trigger (e.g. a library detected error). A log snapshot comprises saving one or more logs for potential export at a later time. The aggregation of log snapshots may occur at the time of, or just before, the export. The aggregation process may combine some or all of the collection or it may preserve the original data format.

In an additional aspect, the automated data storage library may comprise a distributed control system that may have two or more nodes performing a function of the library. For example, a library may have a node associated with a movement of an accessor, a node associated with grabbing data storage cartridges, a node associated with drive communication, and the like. A node may comprise one or more processors or controllers which may have the ability to create and/or collect logs. A log snapshot may be saved when a trigger event is detected.

In one embodiment, when a log snapshot is required, each node in the distributed control system may save its own snapshot (e.g., a snapshot of each individual node) and the saved snapshot on each individual nodes stays with the node until when the saved snapshot is exported. If at some point in time, a user requests a particular snapshot for download, the associated snapshots of each node may be aggregated and exported on demand.

The aggregation of the saved snapshots may occur as a background operation. The aggregation of the saved snapshots may also occur when no host commands are detected that are associated with the library. The aggregation of the saved snapshots may occur when the library is idle (e.g. when the library is not doing anything).

In one aspect, a file names may be used to coordinate multiple logs for aggregation. For example, all related log snapshots may have correlating information in the file name such as, for example, an index or sequence number, date and/or time information, type of trigger, etc. File metadata may also be used to correlate multiple logs for aggregation. For example, files may have metadata for creation date/time, last modification date/time, author, artist, file type, etc.). In another embodiment, a table, list, file or other data structure may be used to correlate which logs are related for aggregation. For example, the library may comprise a log table that contains a list of snapshots and each snapshot may have an index, sequence number, date/time, type of trigger, file name, or other information that allows the library to correlate different snapshots for aggregation.

Figure 10:
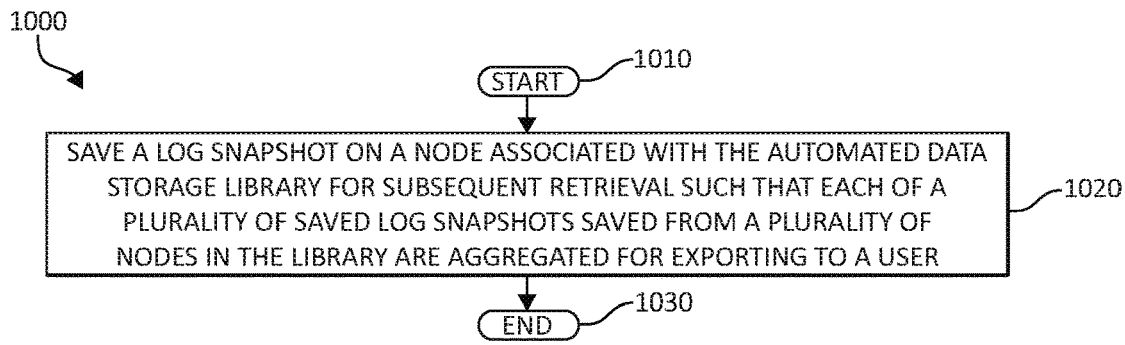
FIG. 10 a flowchart diagram depicting an exemplary method for storing log snapshots in an automated data storage library by a processor; again in which aspects of the present invention may be realized.

Turning now to FIG. 10, a method 1000 for storing log snapshots in an automated data storage library by a processor is depicted, in which various aspects of the illustrated embodiments may be implemented. The functionality 1000 may be implemented as a method executed as instructions on a machine, where the instructions are included on at least one computer readable medium or on a non-transitory machine-readable storage medium. The functionality may start in block 1010. A log snapshot may be saved on a node associated with the automated data storage library for subsequent retrieval such that each of a plurality of saved log snapshots saved from a plurality of nodes in the library are aggregated for exporting to a user, as in block 1020. For example, a user may be connected to the library through a local or remote interface and may select an action for exporting logs. "User" may also refer to a machine (rather than a person). For example, the library may have a mechanism to periodically contact a support center machine and export logs. In this example, the library may be the user. In another example, a support center machine may contact the library to send logs (among other things). In this example, the support center machine may be the user. The functionality 1000 may end at block 1030.

Herein, saved may also be referred to as capturing which may include freezing (e.g., stop adding or modifying information to a log or snapshot), collecting (e.g., gathering different logs, files, snapshots, and/or log data), combining (e.g., concatenating files, logs, snapshots, and/or log data), compressing (e.g., compressing files, logs, snapshots, and/or log data), copying (e.g., copying files, logs, snapshots, and/or log data), saving (e.g., saving files, logs, snapshots, and/or log data), preserving (e.g., preserving files, logs, snapshots, and/or log data), organizing (e.g., organizing files, logs, snapshots, and/or log data), and/or sorting (e.g., sorting files, logs, snapshots, and/or log data), of information contained in one or more logs, files, or snapshots.

The one or more logs may include library logs (e.g., logs maintained by library firmware or software), drive logs (e.g., logs maintained by automated data storage drives), component logs (e.g., logs associated with any components of the library such as power supplies, Ethernet switches, etc.), device logs (e.g., logs associated with any devices connected to the library such as a management console, a service machine, an encryption key server, etc.). The logs may contain trace information (e.g., information related to what the library, drive, component or device was doing), diagnostic information (e.g., information related to problems or errors that may have been encountered by the library, drive, component, or device), statistical information (e.g., information related to the performance or usage of various elements of the library, drive, component, or device), configuration information (e.g., information related to settings and preferences of the library, drive, component, or device), backup information (e.g., a backup of the state, settings, or configuration of the library, drive, component, or device), database information (e.g., information related to any databases that the library, drive, component, or device may have). A snapshot of the one or more logs in an automated data storage library may be stored. The snapshot may be stored within the library itself (e.g., in an automated data storage drive, in a library component, in a device associated with the library, on a hard disk, in nonvolatile memory, CompactFlash card, etc.) or it may be stored outside the library (e.g., on a network attached storage device, on a component associated with the library such as a management console, etc.).

In one aspect, the triggering event may be a library detected error (e.g., a failure to move a cartridge), a drive error (e.g. a failure to load a cartridge), a host error (e.g. a command to the library or drive that results in an illegal request), activation of a designated physical or logical log collection mechanism (e.g., a dedicated log collection button), opening a library door (e.g., opening a library front door, opening a library back door, opening a library side door, etc.), a replacement of a library component (e.g., a power supply), a reset of part or all of the library, a drive reset, a user logs into the library under a service role, and/or identifying a new unique identifier (e.g., a component serial number or MAC address changes).

Figure 11:
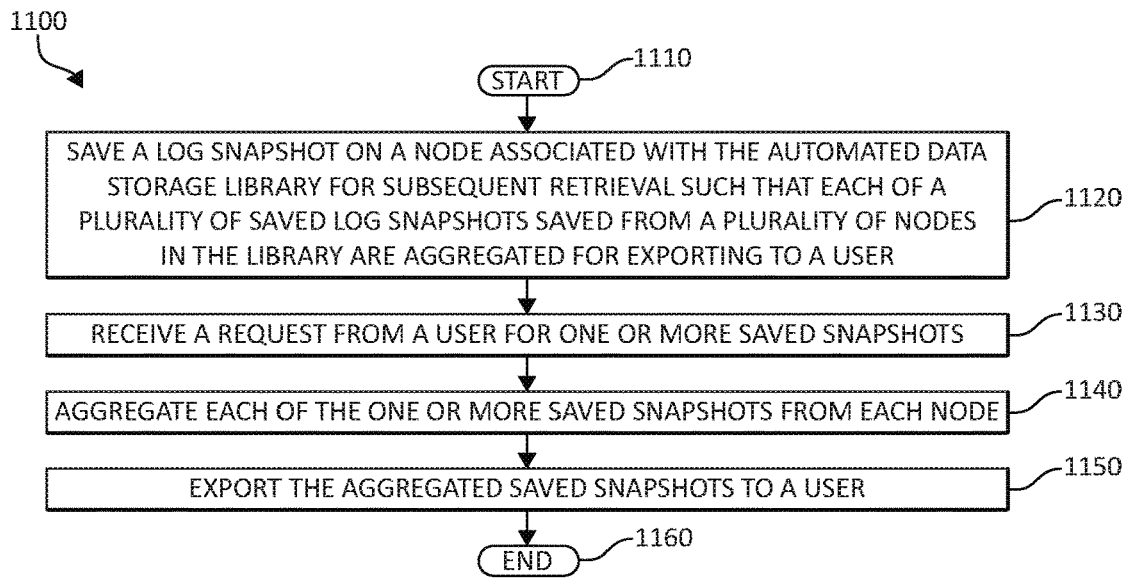
FIG. 11 an additional flowchart diagram depicting an exemplary method for storing log snapshots in an automated data storage library by a processor; again in which aspects of the present invention may be realized.

Turning now to FIG. 11, a method 1100 for storing log snapshots in an automated data storage library is depicted, in which various aspects of the illustrated embodiments may be implemented. The functionality 1100 may be implemented as a method executed as instructions on a machine, where the instructions are included on at least one computer readable medium or on a non-transitory machine-readable storage medium. The functionality may start in block 1110. A log snapshot may be saved on a node associated with the automated data storage library for subsequent retrieval such that each of a plurality of saved log snapshots saved from a plurality of nodes in the library are aggregated for exporting to a user, as in block 1120. In one aspect, the logs may comprise trace information (what was the library doing), diagnostic information (what kinds of error or problems were encountered), statistical information (what was the performance or usage of various library components), configuration information (settings and preferences of the library), backup information (a backup of one or more components of the library state, settings, or configuration), database information (the contents of one more library databases), and/or a combination thereof. A request is received from a user for one or more snapshots, as in block 1130. For example, a user may be connected to the library through a local or remote interface and may select an action for exporting logs. "User" may also refer to a machine (rather than a person). For example, the library may have a mechanism to periodically contact a support center machine and export logs. In this example, the library may be the user. In another example, a support center machine may contact the library to send logs (among other things). In this example, the support center machine may be the user. The one or more snapshots (e.g., snapshots associated with the request) may be aggregated from each one of the nodes, as in block 1140. The aggregation may occur on demand, while the library is not executing host commands, while the library is idle, or as a background operation as previously discussed. The aggregated snapshots may be exported, such as to a user, as in block 1150. The functionality 1100 may end at block 1160.

The mechanisms of the illustrated embodiments provide a solution to maintain the library storage, processor, and/or communication bandwidth from being overwhelmed with a large number of log snapshots by storing log snapshots in an automated data storage library. For example, a snapshot threshold defining a maximum number of snapshots that may be stored may be employed to determine whether the oldest snapshot is to be overwritten. Alternatively, other algorithms could be used to determine which snapshot to overwrite such as one that is evaluated to be less relevant or less critical than others.

Furthermore, the present invention provides for automated data storage systems that may select for export log snapshots (e.g., exporting a log based on a user selection of a specific event or trigger). A user interface (e.g., a GUI) may display log snapshots to identify and select associated logs (individual events or errors which are correlated to a particular log) recorded in a tape library. Individual events or errors may also be displayed and viewed in an event table via the user interface. In one aspect, one or more logs for export may be displayed based on a user entering an event time or trigger time. A user may insert via the user interface information relating to a time period or event (timestamp) for log information that the user may need.

Figure 12:
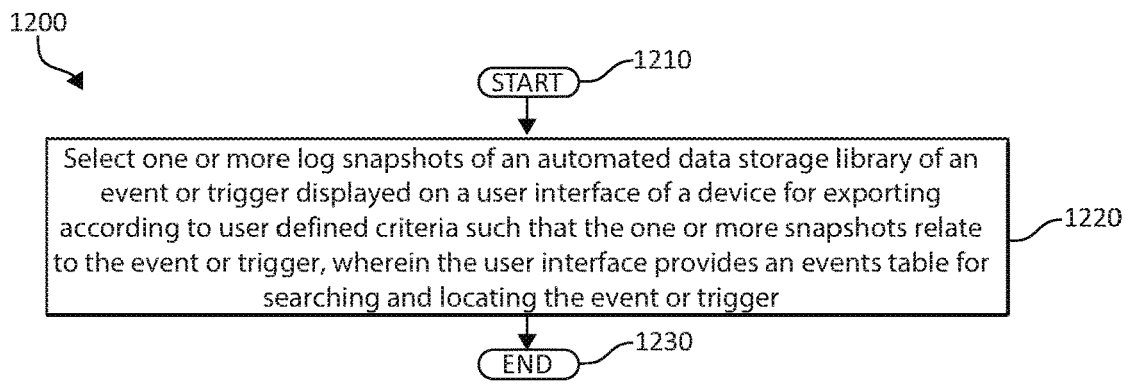
FIG. 12 is an additional flowchart diagram depicting an additional exemplary method for selecting log snapshots for export in an automated data storage library by a processor; again in which aspects of the present invention may be realized.

Turning now to FIG. 12, a method 1200 for storing log snapshots in an automated data storage library is depicted, in which various aspects of the illustrated embodiments may be implemented. The functionality 1200 may be implemented as a method executed as instructions on a machine, where the instructions are included on at least one computer readable medium or on a non-transitory machine-readable storage medium. The functionality may start in block 1210. One or more log snapshots of an automated data storage library of an event or trigger displayed on a user interface of a device for exporting according to user defined criteria such that the one or more snapshots relate to the event or trigger, wherein the user interface provides an events table for searching and locating the event or trigger, as in block 1220. The user interface may provide an events table for searching and locating the event of interest. The user interface may also provide an indication of the presence or absence of snapshots. The functionality 1200 may end at block 1230.

In one aspect, in conjunction with and/or as part of at least one block of FIG. 12, the operation of 1200 may include one or more of each of the following. The operation of 1200 may include selecting the event or trigger via the user interface to enable exportation of the one or more log snapshots corresponding to the event or trigger, displaying via the user interface the one or more log snapshots for exporting according to an event time associated with the event or a trigger time associated with the trigger, and/or exporting the one or more log snapshots according to the event or trigger selected by the user that corresponds to the one or more log snapshots.

The operation of 1200 may include searching a list of snapshots to identify the one or more log snapshots based on a defined date/time range. Each event may be paired with the one or more log snapshots. The date/time data may be associated in trace information that is included in the one or more log snapshots so as to identify the one or more log snapshots based on a defined date/time range.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM, EEPROM or Flash memory), a static random access memory (SRAM), dynamic random access memory (DRAM), a portable compact disc read-only memory (CD-ROM), a digital versatile disk (DVD), a memory stick, a floppy disk, a CompactFlash (CF) card, a Secure Digital (SD) card, a miniSD card, a microSD card, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one aspect, a computer may include a library controller. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computer, or other programmable data processing apparatus to produce a machine, such that the instructions, which execute via the one or more processors of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions. In addition, some blocks may be omitted without deviating from the scope of the invention.

The invention claimed is:

1. A method, by one or more processors, for storing log snapshots in an automated data storage library, comprising:
   saving a log snapshot on a node associated with the automated data storage library for subsequent retrieval such that each of a plurality of saved log snapshots saved from a plurality of nodes associated with the automated data storage library are aggregated for exporting to a user; wherein each of the plurality of saved log snapshots include at least diagnostic information, statistical information, configuration information, backup information at an appliance-level of the automated data storage library including trace data associated with logged operations of physical components of the automated data storage library during a timestamped timeframe, and database information associated with data storage media stored within the automated data storage library; and wherein the log snapshot is established according to a start time and an end time associated with a respective first and last entry of the trace data during the timestamped timeframe; and
   aggregating each of the plurality of saved log snapshots from each respective one of the plurality of nodes upon receiving a request to export the plurality of saved log snapshots; wherein each respective one of the plurality of nodes saves a respective one of the plurality of saved log snapshots according to a triggering event being detected, notwithstanding the plurality of saved log snapshots are individually stored on each respective one of the plurality of nodes until being aggregated together upon receiving the request to export.

2. The method of claim 1, wherein the node is a library controller, a drive controller, a component controller, a device controller, or combinations thereof.

3. The method of claim 1, further including saving the log snapshot on the node upon detecting at least one of a library error, a drive error, a component error, a device error, a host error, activation of a designated physical or logical log collection mechanism, opening a library door, closing a library door, a component replacement, a library reset, a component reset, a device reset, a drive reset, identifying a new unique identifier of a library component, a user logging into the library under a service role, or a combination thereof, wherein the node is performing a function of the automated data storage library.

4. The method of claim 1, further including aggregating each of the plurality of saved log snapshots from each respective one of the plurality of nodes as a background operation of the automated data storage library.

5. The method of claim 1, further including performing one or more of:
   aggregating each of the plurality of saved log snapshots from each respective one of the plurality of nodes while the automated data storage library is idle; or
   aggregating each of the plurality of saved log snapshots from each respective one of the plurality of nodes upon detecting an absence of one or more host commands.

6. The method of claim 1, further including coordinating the plurality of saved logs for the aggregation using at least a file name, file metadata, a data structure, or a combination thereof.

7. A system for storing log snapshots in an automated data storage library, comprising:
   one or more processors with executable instructions that when executed cause the system to:
      save a log snapshot on a node associated with the automated data storage library for subsequent retrieval such that each of a plurality of saved log snapshots saved from a plurality of nodes associated with the automated data storage library are aggregated for exporting to a user; wherein each of the plurality of saved log snapshots include at least diagnostic information, statistical information, configuration information, backup information at an appliance-level of the automated data storage library including trace data associated with logged operations of physical components of the automated data storage library during a certain timeframe, and database information associated with data storage media stored within the automated data storage library; and wherein the log snapshot is established according to a start time and an end time associated with a respective first and last entry of the trace data during the timestamped timeframe; and
      aggregate each of the plurality of saved log snapshots from each respective one of the plurality of nodes upon receiving a request to export the plurality of saved log snapshots; wherein each respective one of the plurality of nodes saves a respective one of the plurality of saved log snapshots according to a triggering event being detected, notwithstanding the plurality of saved log snapshots are individually stored on each respective one of the plurality of nodes until being aggregated together upon receiving the request to export.

8. The system of claim 7, wherein the executable instructions further save the log snapshot on the node upon detecting an error in the automated data storage library.

9. The system of claim 7, wherein the executable instructions further save the log snapshot on the node upon detecting at least one of a library error, a drive error, a component error, a device error, a host error, activation of a designated physical or logical log collection mechanism, opening a library door, closing a library door, a component replacement, a library reset, a component reset, a device reset, a drive reset, identifying a new unique identifier of a library component, a user logging into the library under a service role, or a combination thereof, wherein the node is performing a function of the automated data storage library.

10. The system of claim 7, wherein the node is a library controller, a drive controller, a component controller, a device controller, or combinations thereof.

11. The system of claim 7, wherein the executable instructions further perform one or more of:
- aggregating each of the plurality of saved log snapshots from each respective one of the plurality of nodes as a background operation of the automated data storage library;
- aggregating each of the plurality of saved log snapshots from each respective one of the plurality of nodes while the automated data storage library is idle; and
- aggregating each of the plurality of saved log snapshots from each respective one of the plurality of nodes upon detecting an absence of one or more host commands.

12. The system of claim 7, wherein the executable instructions further coordinate the plurality of saved logs for the aggregation using at least a file name, file metadata, a data structure, or a combination thereof.

13. A computer program product for, by one or more processors, storing log snapshots in an automated data storage library, the computer program product comprising a non-transitory computer-readable storage medium having computer-readable program code portions stored therein, the computer-readable program code portions comprising:
- an executable portion that saves a log snapshot on a node associated with the automated data storage library for subsequent retrieval such that each of a plurality of saved log snapshots saved from a plurality of nodes associated with the automated data storage library are aggregated for exporting to a user; wherein each of the plurality of saved log snapshots include at least diagnostic information, statistical information, configuration information, backup information at an appliance-level of the automated data storage library including trace data associated with logged operations of physical components of the automated data storage library during a certain timeframe, and database information associated with data storage media stored within the automated data storage library; and wherein the log snapshot is established according to a start time and an end time associated with a respective first and last entry of the trace data during the timestamped timeframe; and
- an executable portion that aggregates each of the plurality of saved log snapshots from each respective one of the plurality of nodes upon receiving a request to export the plurality of saved log snapshots; wherein each respective one of the plurality of nodes saves a respective one of the plurality of saved log snapshots according to a triggering event being detected, notwithstanding the plurality of saved log snapshots are individually stored on each respective one of the plurality of nodes until being aggregated together upon receiving the request to export.

14. The computer program product of claim 13, further including an executable portion that saves the log snapshot on the node upon detecting at least one of a library error, a drive error, a component error, a device error, a host error, activation of a designated physical or logical log collection mechanism, opening a library door, closing a library door, a component replacement, a library reset, a component reset, a device reset, a drive reset, identifying a new unique identifier of a library component, a user logging into the library under a service role, or a combination thereof, wherein the node is performing a function of the automated data storage library.

15. The computer program product of claim 13, wherein the node is a library controller, a drive controller, a component controller, a device controller, or combinations thereof.

16. The computer program product of claim 13, further including an executable portion that:
- aggregates each of the plurality of saved log snapshots from each respective one of the plurality of nodes as a background operation of the automated data storage library;
- aggregates each of the plurality of saved log snapshots from each respective one of the plurality of nodes while the automated data storage library is idle; or
- aggregates each of the plurality of saved log snapshots from each respective one of the plurality of nodes upon detecting an absence of one or more host commands.

17. The computer program product of claim 13, further including an executable portion that coordinates the plurality of saved logs for the aggregation using at least a file name, file metadata, a data structure, or a combination thereof.

* * * * *